(12) United States Patent
Niitsuma et al.

(10) Patent No.: US 7,537,283 B2
(45) Date of Patent: May 26, 2009

(54) AUTOMOBILE SEAT WITH IMPACT-ABSORBABLE SEATBACK

(75) Inventors: Kenichi Niitsuma, Takanezawa-machi (JP); Masami Yoshida, Takanezawa-machi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/815,236

(22) PCT Filed: Feb. 3, 2006

(86) PCT No.: PCT/JP2006/302292

§ 371 (c)(1),
(2), (4) Date: Sep. 19, 2007

(87) PCT Pub. No.: WO2006/083024

PCT Pub. Date: Aug. 10, 2006

(65) Prior Publication Data

US 2008/0258519 A1    Oct. 23, 2008

(30) Foreign Application Priority Data

Feb. 4, 2005    (JP) ............................. 2005-028564

(51) Int. Cl.
*B60N 2/42*    (2006.01)
*B60N 2/427*    (2006.01)
(52) U.S. Cl. ............................. 297/216.13; 297/216.14; 297/216.1
(58) Field of Classification Search ............ 297/216.13, 297/216.14, 216.1
See application file for complete search history.

(56) References Cited

U.S. PATENT DOCUMENTS

| 4,040,660 | A | * | 8/1977 | Barecki | 297/216.13 |
| 4,076,306 | A | * | 2/1978 | Satzinger | 297/216.13 |

(Continued)

FOREIGN PATENT DOCUMENTS

JP    10-278645    10/1998

(Continued)

*Primary Examiner*—Rodney B White
(74) *Attorney, Agent, or Firm*—Shoemaker and Mattare

(57) ABSTRACT

In an automobile seat provided with a seatback having a metal-made seatback frame of a substantially quadrilateral shape, the seatback frame comprising a pair of spaced apart left and right side frame sections 10a, 10b, an upper frame section 11 interconnecting upper end portions of the side frame sections 10a, 10b, and a lower frame section 12 interconnecting lower end portions of the side frame sections 10a, 10b, the lower frame section comprises a horizontally extending body arranged between the lower end portions of the side frame sections 10a, 10b, side bracket portions 12a, 12b provided at left and right ends of the horizontally extending body so as to project forward from the horizontally extending body, the side bracket portions 12a, 12b being applied and fixed to the lower end portions of the side frame sections 10a, 10b, and a structure for serving to facilitate deformation of the seatback in the event of a car crash or the like in order to absorb impact caused by the car crash or the like, the structure comprising a recess portion 13 which extends along the horizontally extending body and around the side bracket portions, and the recess portion being formed into a semi-circular shape in cross-section.

1 Claim, 5 Drawing Sheets

U.S. PATENT DOCUMENTS

| | | | |
|---|---|---|---|
| 5,219,202 A * | 6/1993 | Rink et al. | 297/216.13 |
| 6,024,406 A * | 2/2000 | Charras et al. | 297/216.14 |
| 6,050,637 A * | 4/2000 | Haland et al. | 297/216.14 |
| 6,179,379 B1 * | 1/2001 | Andersson | 297/216.13 |
| 6,296,306 B1 * | 10/2001 | Specht et al. | 297/216.14 |
| 6,390,549 B1 * | 5/2002 | Mayer et al. | 297/216.14 |
| 6,416,126 B1 * | 7/2002 | Haland et al. | 297/216.13 |
| 6,767,054 B2 * | 7/2004 | Haland et al. | 297/216.13 |
| 6,786,543 B2 * | 9/2004 | Andersson et al. | 297/216.13 |
| 7,070,236 B2 * | 7/2006 | Kawashima | 297/216.14 |
| 7,134,716 B2 * | 11/2006 | Wieclawski | 297/216.13 |
| 7,303,229 B2 * | 12/2007 | Fujita et al. | 297/216.14 |
| 2003/0116999 A1 * | 6/2003 | Fujita et al. | 297/216.13 |
| 2005/0140190 A1 * | 6/2005 | Kawashima | 297/216.14 |

FOREIGN PATENT DOCUMENTS

| | | |
|---|---|---|
| JP | 2000-118279 | 4/2000 |
| JP | 2001-270356 | 10/2001 |
| JP | 2003-335162 | 11/2003 |

* cited by examiner

AUTOMOBILE SEAT WITH IMPACT-ABSORBABLE SEATBACK

TECHNICAL FIELD

The present invention relates to an automobile seat provided with a seatback in which, when subjected to impact caused by a car crash or the like, a seatback frame of the seatback can absorb impact energy.

BACKGROUND ART

Generally, an automobile seat comprises a seat cushion mounted on a floor of an automobile, and a seatback pivotally supported to a rear portion of the seat cushion by recliner devices so as to be pivoted forward and rearward relative to the seat cushion and in such a manner that an angle of the seatback relative to the seat cushion can be adjusted.

The seatback includes a seatback frame which is formed into a substantially quadrilateral shape. The seatback frame comprises a main pipe member of a substantially U-shape arranged with an opening thereof facing downward, an upper frame member formed by press-machining a plate of steel into a predetermined shape and fixed to an upper axial-portion of the main pipe member by welding, left and right side frame members formed by press-machining plates of steel into predetermined shapes and fixed to left and right axial-portions of the main pipe member by welding, and a linear pipe member serving as a lower frame member of the seatback frame, disposed between lower end portions of the left and right axial-portions of the main pipe member and fixed to the lower end portions of the left and right axial-portions of the main pipe member.

There has been known a seatback (Japanese Patent Application Laid-Open No. Hei. 10-103880), in which the linear pipe member of the above-mentioned seatback frame is divided into two pipe member segments in order that impact energy produced by a car crash or the like can be absorbed. Each of the pipe member segments is fixed at an outer end portion thereof to corresponding one of the side frame members by welding. An intermediate pipe member is slidably inserted at both end portions thereof in inner end portions of the pipe member segments.

When the automobile seat is subjected to impact caused by the car crash or the like and a weight load of an occupant on the automobile seat is applied to the seatback, the lower pipe member is operatively made to flex in left, right and rear directions, the pipe member segments are operatively spaced apart from each other in the left and right directions, and the intermediate pipe member is slid relative to the pipe member segments, whereby the entire lower frame member is deformed rearward. Thus, the rearward deformation of the lower frame member is made to thereby absorb the impact.

However, in the automobile seat constructed as discussed above, there is a drawback that, when the weight load of the occupant on the automobile seat is applied to the seatback by the impact, the intermediate pipe member will be unable to be smoothly slid relative to the pipe member segments, thus making it impossible to exhibit a required impact-absorbing function. Moreover, the lower frame member is composed of the pipe member segments and the intermediate pipe member, so that the lower frame member becomes complicated in structure and assembling of the lower frame member is complicated.

SUMMARY OF THE INVENTION

It is therefore an object of the present invention to provide an automobile seat with a seatback in which, when the automobile seat is subjected to impact caused by a car crash or the like and a weight load of an occupant on the seat is applied to the seatback of the automobile seat, the seatback is deformed rearward, to thereby positively absorb impact energy which is caused by the car crash or the like, and in which the seatback can be easily assembled.

In accordance with the present invention, there is provided an automobile seat provided with a seatback having a metal-made seatback frame of a substantially quadrilateral shape, the seatback frame comprising a pair of spaced apart left and right side frame sections, an upper frame section interconnecting upper end portions of the side frame sections, and a lower frame section interconnecting lower end portions of the side frame sections, the lower frame section comprising a horizontally extending body arranged between the lower end portions of the side frame sections, side bracket portions provided at left and right ends of the horizontally extending body so as to project forward from the horizontally extending body, the side bracket portions being applied and fixed to the lower end portions of the side frame sections, and means for serving as means to facilitate deformation of the seatback in the event of a car crash or the like in order to absorb impact caused by the car crash or the like, the means comprising a recess portion which extends along the horizontally extending body and around the side bracket portions, and the recess portion being formed into a semi-circular shape in cross-section.

In the automobile seat according to the present invention, when the automobile seat is subjected to impact caused by the car crash or the like and a weight of an occupant on the automobile seat is then applied to the seatback, the semi-circular-shaped recess portion is deformed in such a direction that an opening thereof gets narrow or is closed and the seatback is then deformed in such a manner that an upper portion thereof is tilted rearward about the deformed recess portion of the lower frame section, so that impact energy produced by the car crash or the like can be absorbed by the simple structure comprising the semi-circular-shaped recess portion, and the impact which is applied to the occupant on the automobile seat can be positively relieved by the rearward tilting of the seatback.

DETAILED DESCRIPTION OF THE PREFERRED EMBODIMENT

An automobile seat according to an embodiment of the present invention will be discussed hereinafter with reference to the accompanying drawings. The automobile seat according to the present invention comprises a seatback and a seat cushion. In the Figures, there is illustrated a frame structure of the automobile seat which comprises a frame 1 for the seatback and a frame 2 for the seat cushion. These frames are main components of the automobile seat. The remaining components of the automobile seat which include a pad of the seatback, a pad of the seat cushion, zigzag springs for supporting the pads, and other details are omitted from illustration for the sake of brevity.

Figure 1:
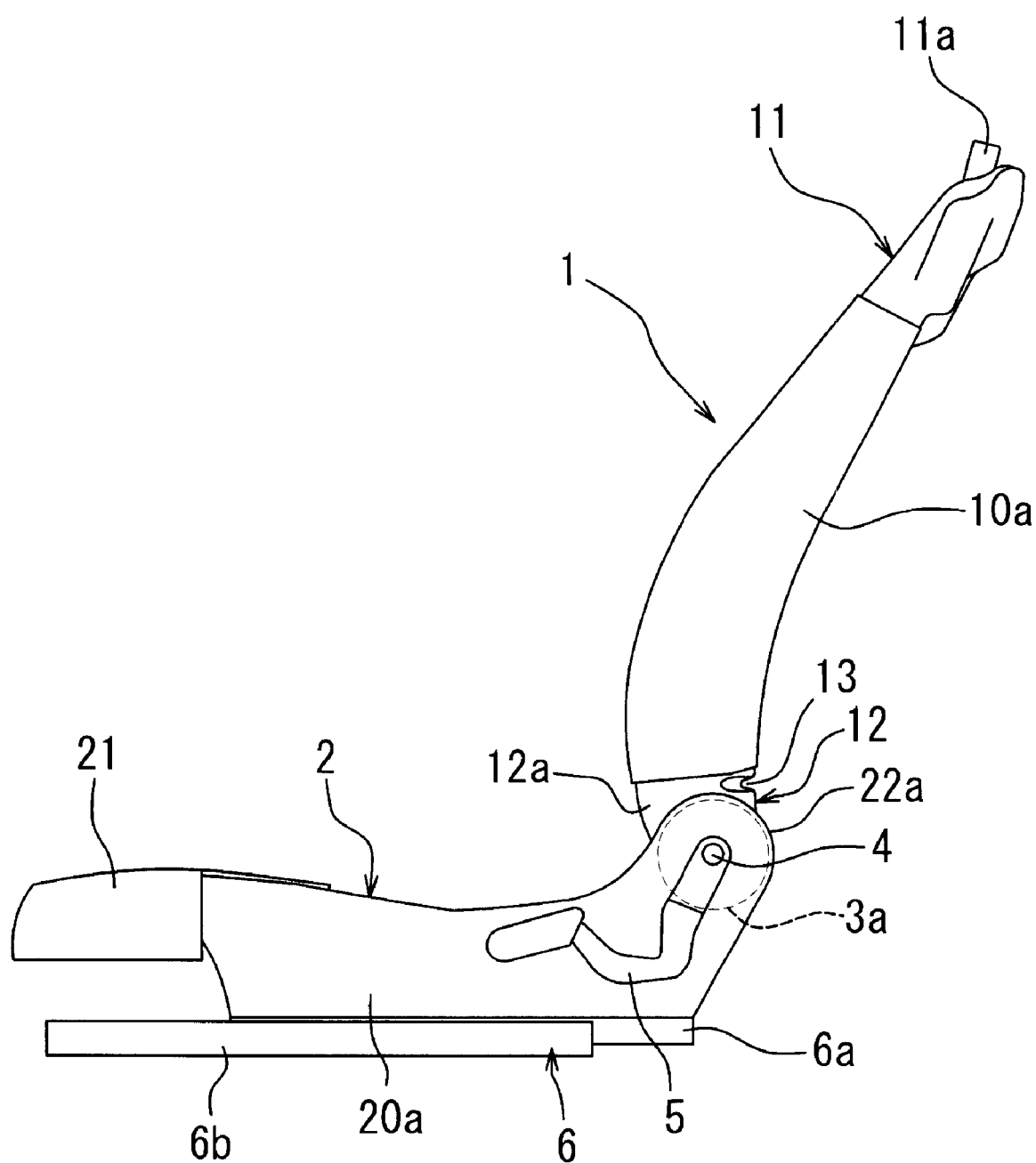
FIG. 1 is a schematic side view of a frame structure of an automobile seat according to an embodiment of the present invention.

Referring now to FIG. 1, the seatback frame 1 of the seatback is formed by press-machining plates of ultra-high tensile strength steel or the like into predetermined three-dimensional shapes, to thereby form predetermined three-dimensional components of the seatback frame 1, and then causing the components to be joined to one another by spot-welding. Similarly, the seat cushion frame 2 of the seat cushion is formed by press-machining plates of ultra-high tensile strength steel or the like into predetermined three-dimensional shapes, to thereby form predetermined three-dimensional components of the seat cushion frame 2, and then causing the components of the seat cushion 2 to be joined to one another by spot-welding.

Figure 2:
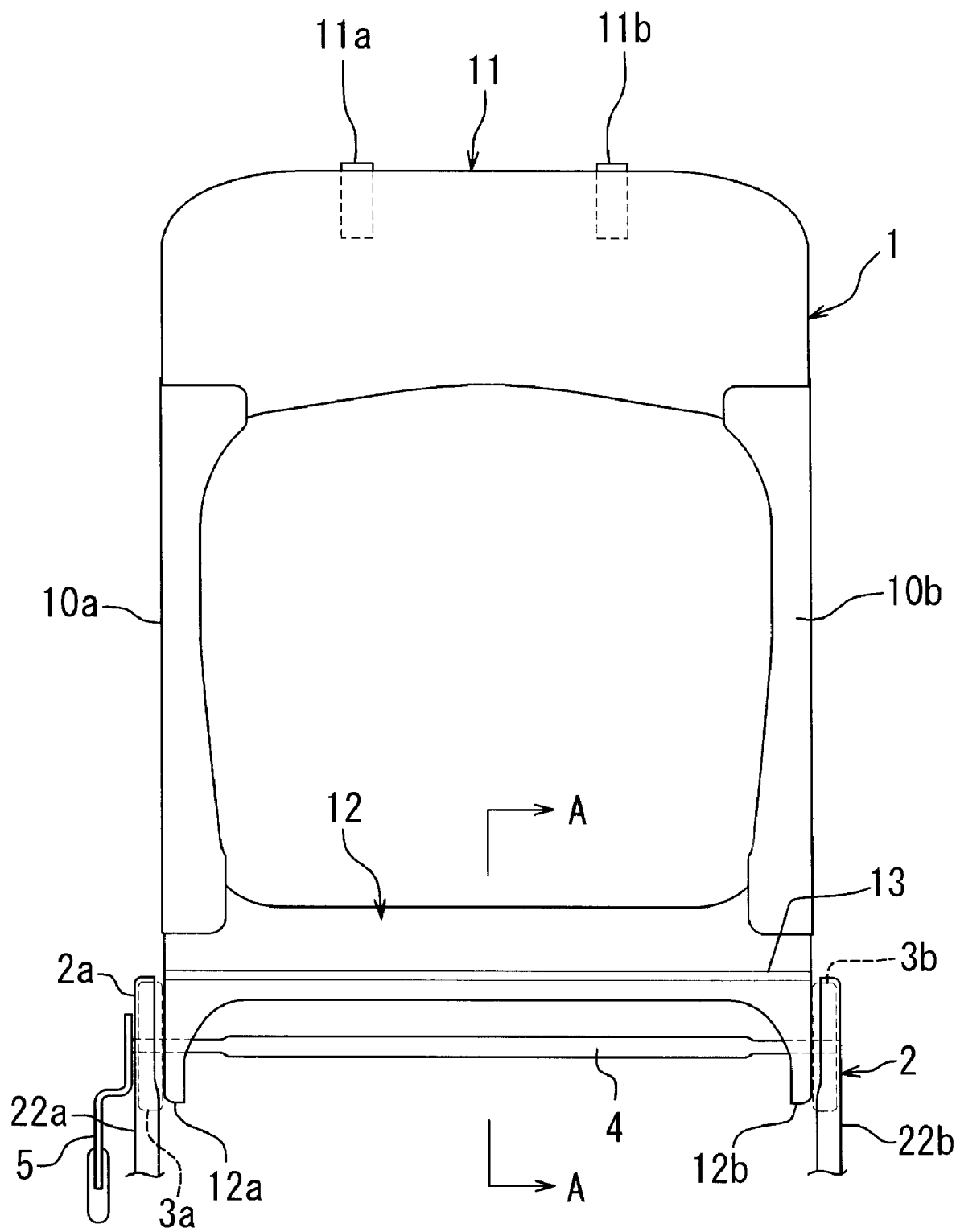
FIG. 2 is a schematic rear view of the frame structure of FIG. 1.

Referring to FIG. 2, there is illustrated the frame structure as viewed from the rear side. The seatback frame 1 is formed into a substantially quadrilateral shape and comprises a pair of spaced apart left and right side frame sections 10a, 10b, an upper frame section 11 interconnecting upper end portions of the side frame sections 10a, 10b, and a lower frame section 12 interconnecting lower end portions of the side frame sections 10a, 10b. In FIG. 2, reference numerals 11a, 11b denote holders for receiving stays of a headrest (not shown).

The lower frame section 12 is bridged between the lower end portions of the side frame section 10a, 10b. More particularly, the lower frame section 12 is formed as a one-piece member that comprises a horizontally extending body and side bracket portions 12a, 12b provided at the left and right ends of the horizontally extending body so as to project forward from the horizontally extending body. The side bracket portions 12a, 12b are applied and fixed to the lower end portions of the side frame sections 10a, 10b.

Figure 3:
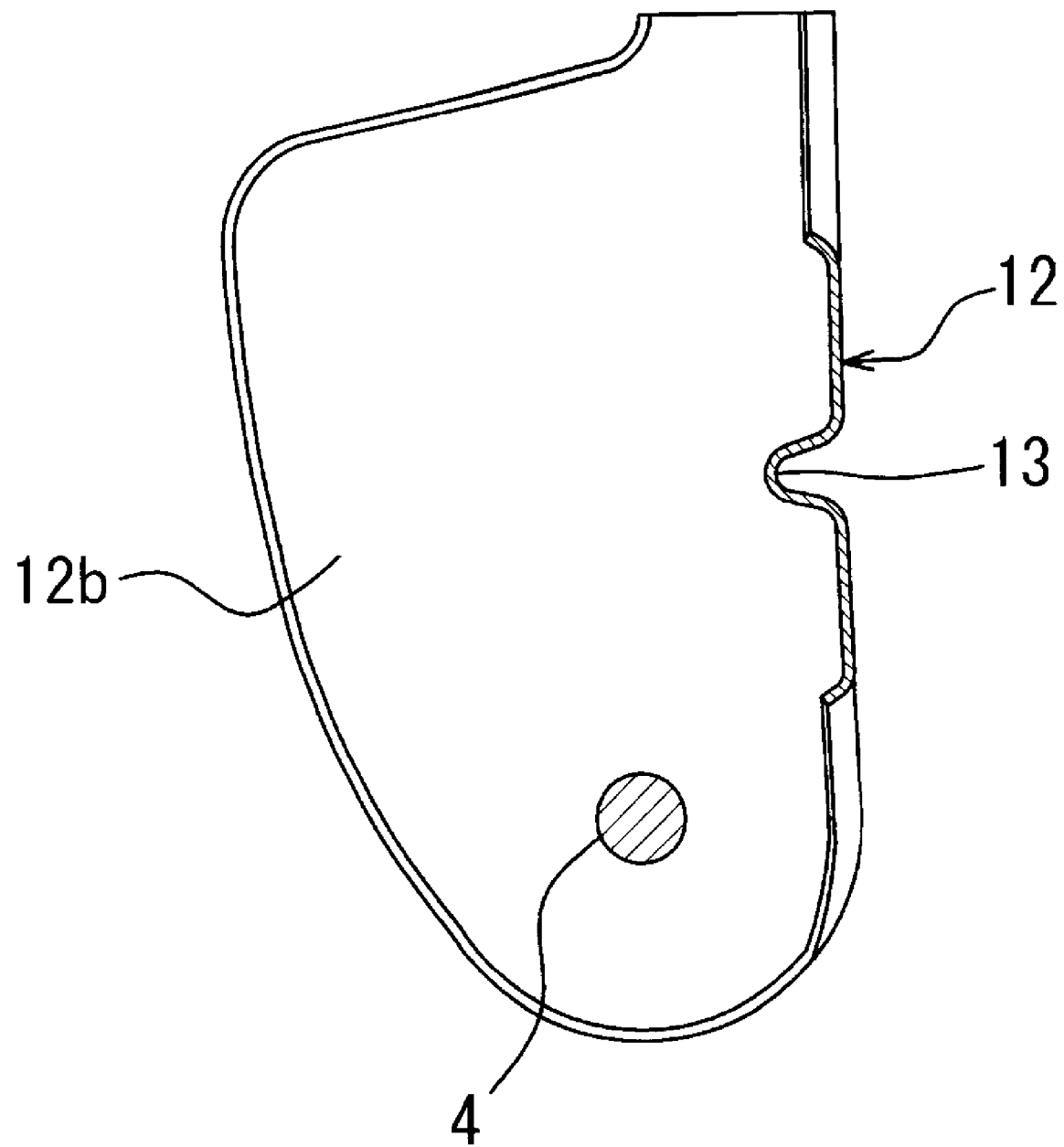
FIG. 3 is a schematic sectional view of the frame structure, taken along line A-A in FIG. 2.

The lower frame section 12 has means to facilitate rearward deformation of the seatback frame in the event of a car crash or the like in order to absorb impact caused by the car crash or the like. The means comprises a recess portion 13 which linearly extends along the horizontally extending body of the lower frame section 12 and around the side bracket portions 12a, 12b. The recess portion 13 is formed by causing predetermined regions of the horizontally extending body and side bracket portions 12a, 12b of the lower frame section 12 to be bulged inward, and has a semi-circular shape in cross-section as shown in FIG. 3. As shown in FIG. 1, an opening of the recess portion 13 faces rearward of the seatback.

The seat cushion frame 2 comprises a pair of spaced apart left and right side frame sections 20a (only one side frame section 20a is shown in FIG. 1), and a forward frame section 21 composed of a pan frame, fitted on forward end portions of the side frame sections 20a, and fixed to the forward end portions of the side frame sections 20a. The side frame sections 20a are provided at rear end portions thereof with side bracket portions 22a, 22b which are continuously extended from the rear end portions of the side frame sections 20a so as to stand upwardly.

As shown in FIG. 2, a first reclining lock device 3a and a second reclining lock device 3b are interposedly held between the side bracket portion 12a of the seatback frame 1 and the side bracket portion 22a of the seat cushion frame 1, and between the side bracket portion 12b of the seatback frame 1 and the side bracket portion 22b of the seat cushion frame 1, respectively. The reclining lock devices 3a, 3b are coupled to each other by a support shaft 4 which is inserted through the side bracket portions 12a, 22a, 12b, 22b and the reclining lock devices 3a, 3b. An operating lever 5 for causing the reclining lock devices 3a, 3b to be unlocked is mounted on an end of the support shaft 4 which is projected laterally from the side bracket portion 22a of the seat cushion frame 2. Thus, rearward and forward pivotal movement of the seatback relative to the seat cushion and adjustment of an angle of the seatback relative to the seat cushion can be performed by operating the operating lever 5.

Moreover, the automobile seat according to the present invention is constructed as a slide type-automobile seat. More particularly, as shown in FIG. 1, the automobile seat is provided with a slide rail mechanism 6 which comprises a pair of spaced apart lower rail members 6b mounted on a floor of an automobile (only one lower rail member 6b is shown in FIG. 1), and a pair of spaced apart upper rail members 6a fixed to the side frame sections 20a of the seat cushion 2 and engaged with the lower rail members 6b in slidable relation-ship with the lower rail members 6b (only one upper rail member 6a is shown in FIG. 1).

The seatback comprises the seatback frame 1, the seatback pad combined with the seatback frame 1, and a trim cover covering a combination of the seatback frame 1 and the seatback pad. Similarly, the seat cushion comprises the seat cushion frame 2, the seat cushion pad combined with the seat cushion frame 2, and a trim cover covering a combination of the seat cushion frame 1 and the seat cushion pad.

Figure 4:
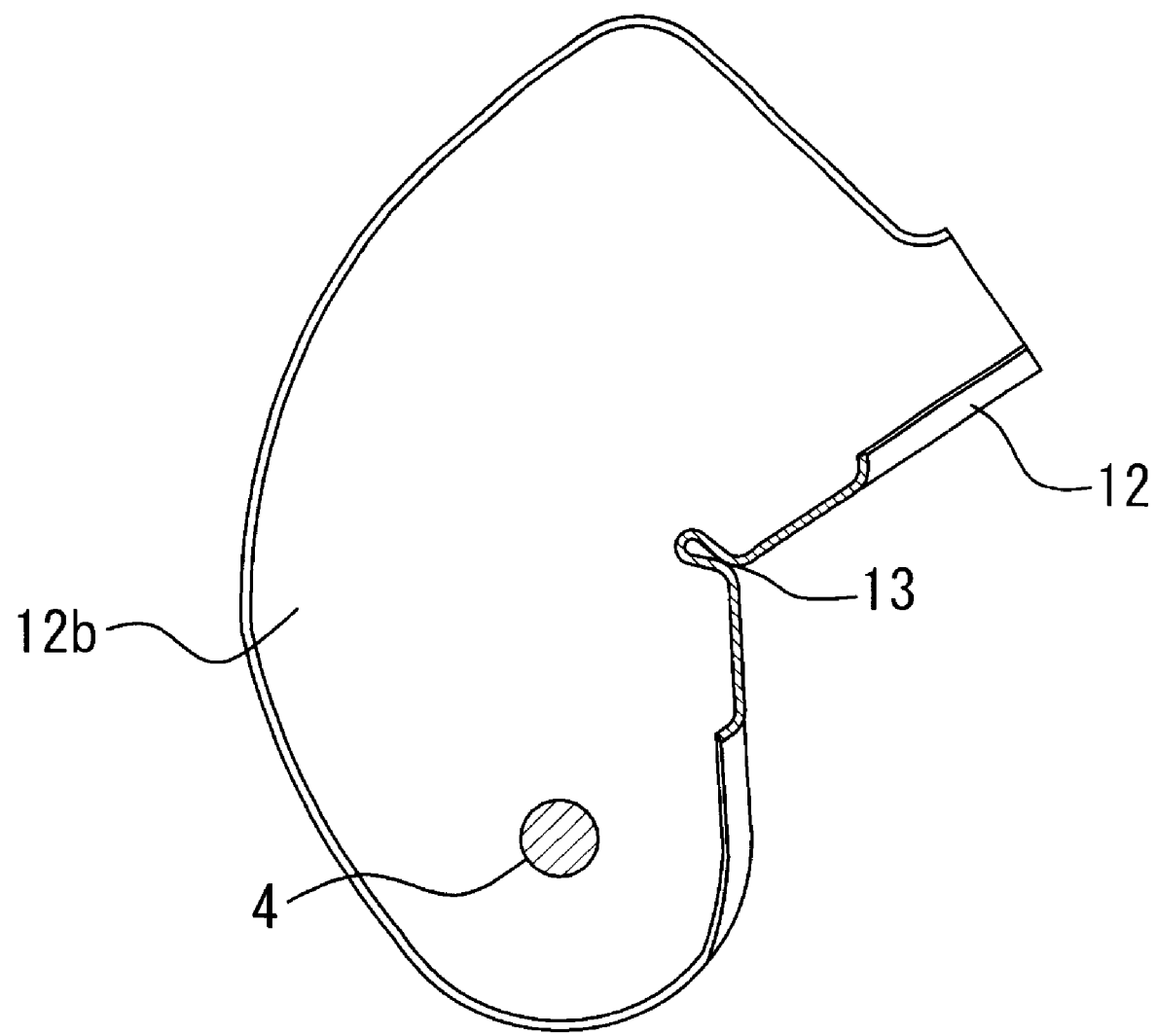
FIG. 4 is a view which is of assistance in explaining a impact-absorbing operation on the basis of the frame structure of FIG. 3.
Figure 5:
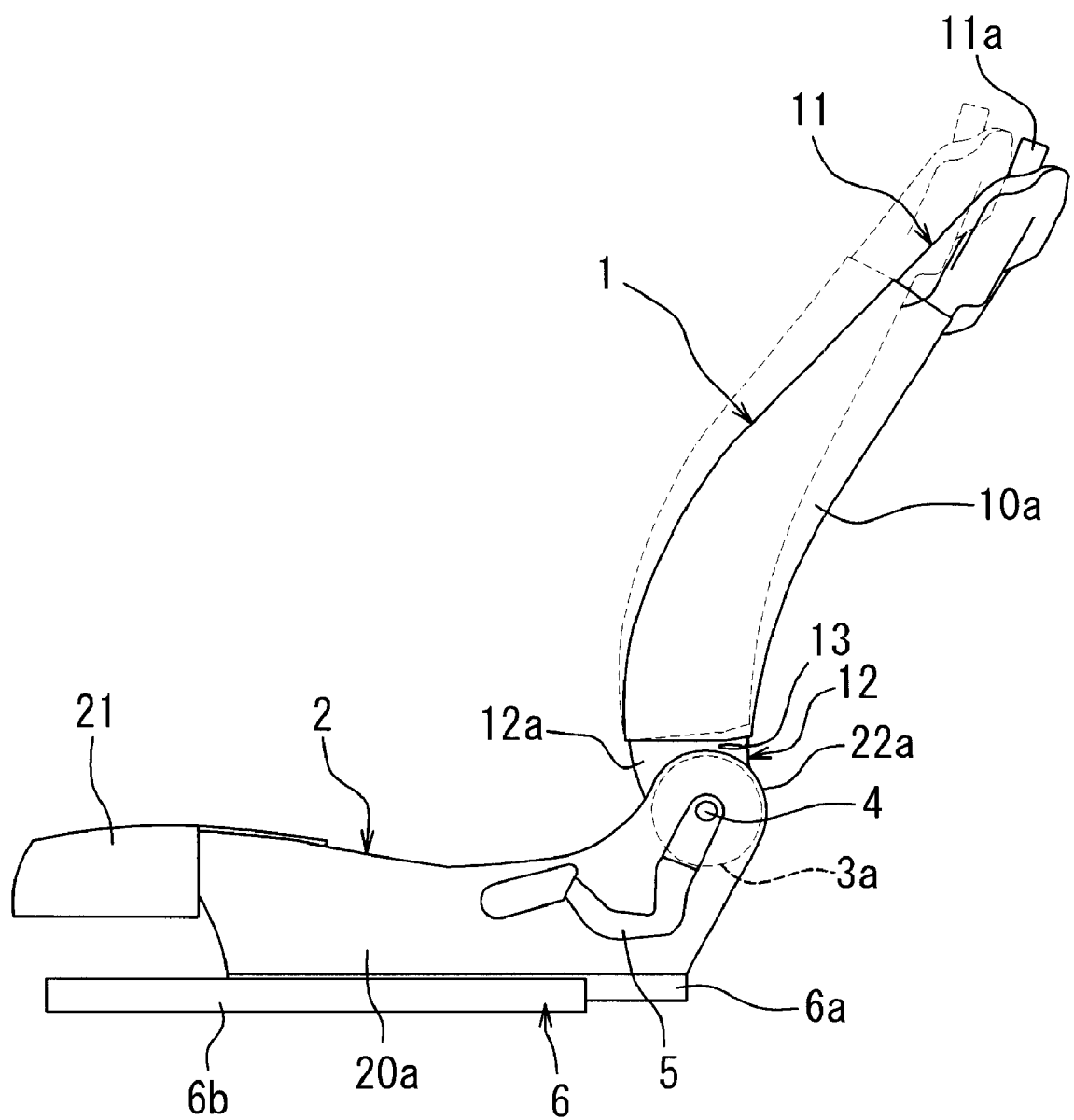
FIG. 5 is a schematic side view of the frame structure of FIG. 1 which is of assistance in explaining the impact-absorbing operation.

In the automobile seat constructed as discussed above, when the automobile seat is subjected to impact caused by the car crash or the like and a weight of an occupant on the automobile seat is then applied to the seatback, the semi-circular-shaped recess portion 13 is deformed in such a direction that an opening thereof gets narrow or is closed as shown in FIG. 4, and the seatback frame 1 is then deformed in such a manner that an upper portion thereof is tilted rearward about the deformed recess portion 13 of the lower frame section 12 as shown in FIG. 5.

The lower frame section 12 includes the left and right side bracket portions 12a, 12b, the recess portion 13 extends along the horizontally extending body of the lower frame section 12 and around the side bracket portions 12a, 12b of the lower frame section 12, and the side bracket portions 12a, 12b are retained by the reclining lock devices 3a, 3b, so that the upper portion of the seatback frame 1 is stably tilted rearward about the deformed recess portion 13 of the lower frame section 12. Thus, impact energy produced by the car crash or the like can be absorbed by the simple structure comprising the semi-circular-shaped recess portion 13, and the impact which is applied to the occupant on the automobile seat can be positively relieved by the rearward tilting of the seatback.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An automobile seat provided with a seatback having a metal-made seatback frame of a substantially quadrilateral shape, said seatback frame comprising a pair of spaced apart left and right side frame sections, an upper frame section interconnecting upper end portions of said side frame sections, and a lower frame section interconnecting lower end portions of said side frame sections;

said lower frame section comprising a horizontally extending body arranged between said lower end portions of said side frame sections, side bracket portions provided at left and right ends of said horizontally extending body so as to project forward from said horizontally extending body, said side bracket portions being applied and fixed to said lower end portions of said side frame sections, and means to facilitate rearward deformation of said seatback in the event of a car crash in order to absorb impact caused by the car crash;

said means comprising a recess portion which extends along said horizontally extending body and around said side bracket portions, said recess portion being formed into a semi-circular shape in cross-section with an opening thereof facing rearward of said seatback, so that when said automobile seat is subjected to the impact by the car crash and a weight of an occupant on said automobile seat is then applied to said seatback, said opening of said recess is closed, thereby causing said seatback to be deformed rearward in such a manner that the impact can be absorbed by the rearward deformation of said seat back.

* * * * *